United States Patent [19]

Hirose

[11] Patent Number: 5,203,018
[45] Date of Patent: Apr. 13, 1993

[54] SPACE DIVERSITY SYSTEM SWITCHING TRANSMISSION

[75] Inventor: Toshiyuki Hirose, Tokyo, Japan

[73] Assignee: OKI Electric Industry Co., Ltd., Tokyo, Japan

[21] Appl. No.: 544,514

[22] Filed: Jun. 27, 1990

[30] Foreign Application Priority Data

Jul. 6, 1989 [JP] Japan ................... 1-172973

[51] Int. Cl.$^5$ ........................ H04B 7/06; H04L 1/08
[52] U.S. Cl. ..................................... 455/61; 375/40; 455/101; 455/133
[58] Field of Search ............... 455/78, 101, 102, 132, 455/133, 137, 277, 103, 104, 59, 61; 375/40; 371/69.1

[56] References Cited

U.S. PATENT DOCUMENTS

| 4,383,332 | 5/1983 | Glance et al. | 455/33 |
| 4,513,412 | 4/1985 | Cox | 370/29 |
| 4,541,095 | 9/1985 | Vries | 371/69 |
| 4,578,819 | 3/1986 | Shimizu | 455/135 |
| 4,756,023 | 7/1988 | Kojima | 455/134 |
| 4,766,599 | 8/1988 | Miyazaki | 375/8 |
| 4,849,990 | 7/1989 | Ikegami et al. | 375/40 |
| 4,926,498 | 5/1990 | Suzuki et al. | 455/133 |

FOREIGN PATENT DOCUMENTS 0175333 10/1983 Japan ................... 455/101

*Primary Examiner*—Curtis Kuntz
*Assistant Examiner*—Chi H. Pham

[57] ABSTRACT

Fixed radio equipment serving as a base station includes a transmitter, a plurality of antennas, and a selective control circuit. The antennas are spaced apart from each other by a distance which minimizes a correlation of interferential fading. The transmitter modulates a carrier by identical signals to be transmitted during periods associated in number with the antennas and feeds the resulting bursts of the carrier time-serially to a selective control circuit. The selective control circuit delivers one of the successive bursts of the carrier fed from the transmitter to one of the antennas and then delivers another burst following the above-mentioned burst to another one of the antennas. Mobile radio equipment or station has a single antenna for receiving the identical signals transmitted time-serially from the base station. The mobile station selects and outputs either one of the received signals which has higher quality than the other.

11 Claims, 3 Drawing Sheets

SPACE DIVERSITY SYSTEM SWITCHING TRANSMISSION

BACKGROUND OF THE INVENTION

1. Field of the Invention

The present invention relates to a radio system and, more particularly, to a space diversity system suitable for a fixed base station included in a digital mobile radio system of the type consuming little power.

2. Description of the Prior Art

In a digital radio system, interferential fading is apt to lower received power and distort waveforms to thereby aggravate the error probability. A space diversity system is an implementation available for coping with such fading. Generally, the term "diversity" is directed to a receiving system of the kind using two or more receivers which have little correlation with respect to interferential fading, i.e., which do not undergo deterioration in quality at the same time. The outputs of the two or more receivers are selectively used or mixed together to reduce the influence of interferential fading. The term "space diversity" refers to a system in which antennas are located spatially apart from each other to produce received input electric fields which have little correlation with respect to interferential fading. These concepts are described in "Digital Microwave Communication" supervised by Kuwabara, Kikaku Center, Japan, pp. 219-221, May 25, 1984.

Space diversity is generally classified into two types, i.e., selective space diversity which selects and outputs one of two received signals having higher quality than the other, and a mixing space diversity which mixes two received signals and outputs the resulting composite signal, as taught in the above document, pp. 221-225, for example. An actual system is designed by choosing the optimal one of the two different systems in consideration of the purpose of communication, reliability, etc.

However, with portable radio equipment intended for data transmission, it is difficult to use a plurality of antennas and receivers because such equipment has to be miniature and light weight. For this reason, a portable receiver is not practicable with the space diversity system and is, therefore, forced to accept the degradation in error probability ascribable to interferential fading.

To achieve higher data reliability in the above situation, data may be corrected, retransmitted or otherwise manipulated by detecting errors, as proposed in the past. These conventional approaches, however, are not effective when it comes to a critical degree of interferential fading.

SUMMARY OF THE INVENTION

It is therefore an object of the present invention to provide a space diversity system which reduces error probability ascribable to fading and is suitable for, among others, portable mobile communication equipment intended for data transmission.

The present invention improves the facilities of a fixed base station which communicates with a portable mobile station so as to overcome the problem that mobile radio equipment serving as a receiving station cannot itself adopt the space diversity system.

In one aspect of the present invention, fixed station radio equipment includes a transmitter for modulating a carrier by a signal to be transmitted, and a plurality of antennas spaced apart from each other by a distance which substantially minimizes a correlation among them of interferential fading. The transmitter modulates a carrier by identical signals to be transmitted during successive periods associated in number with the antennas and feeds the resulting identical bursts of the carrier time-serially to a selective control circuit. The selective control circuit feeds one of the successive bursts of the carrier fed from the transmitter to one of the antennas and then feeds another burst of the carrier following the one burst to another one of the antennas.

In another aspect of the present invention, mobile station radio equipment receives a signal transmitted from fixed station radio equipment which comprises a plurality of antennas spaced apart from each other by a distance which substantially minimizes a correlation of interferential fading. The fixed station radio equipment sequentially selects and transmits identical signals to be transmitted to the plurality of antennas one at a time. The mobile station radio equipment comprises a single antenna for receiving the identical signals transmitted time-serially from the fixed station radio equipment. The mobile station radio equipment selects and outputs one of the received signals having higher quality than the other.

In accordance with the present invention, when the fixed station radio equipment transmits data, it sends a signal via one of a plurality of antennas adapted for space diversity and then sends the same transmit signal via another antenna. The mobile station radio equipment receives the successive signals sent from the base station by a single antenna. Usually, data handled by a mobile radio system and, therefore, the receiving period at the mobile station, is short. Hence, the correlation coefficient at the antenna of the mobile station and associated with interferential fading does not noticeably fluctuate within the receiving period, so that a satisfactory space diversity effect is achievable.

The fixed station radio equipment receives a signal, sent from the mobile station radio equipment, by a plurality of antennas at the same time. The received signals are mixed or switched over to achieve the space diversity effect.

BRIEF DESCRIPTION OF THE DRAWINGS

The objects and features of the present invention will become more apparent from the consideration of the following detailed description taken in conjunction with the accompanying drawings in which:

FIG. 1A is a block diagram of the transmitter of the base station;

DESCRIPTION OF THE PREFERRED EMBODIMENTS

Figure 1:
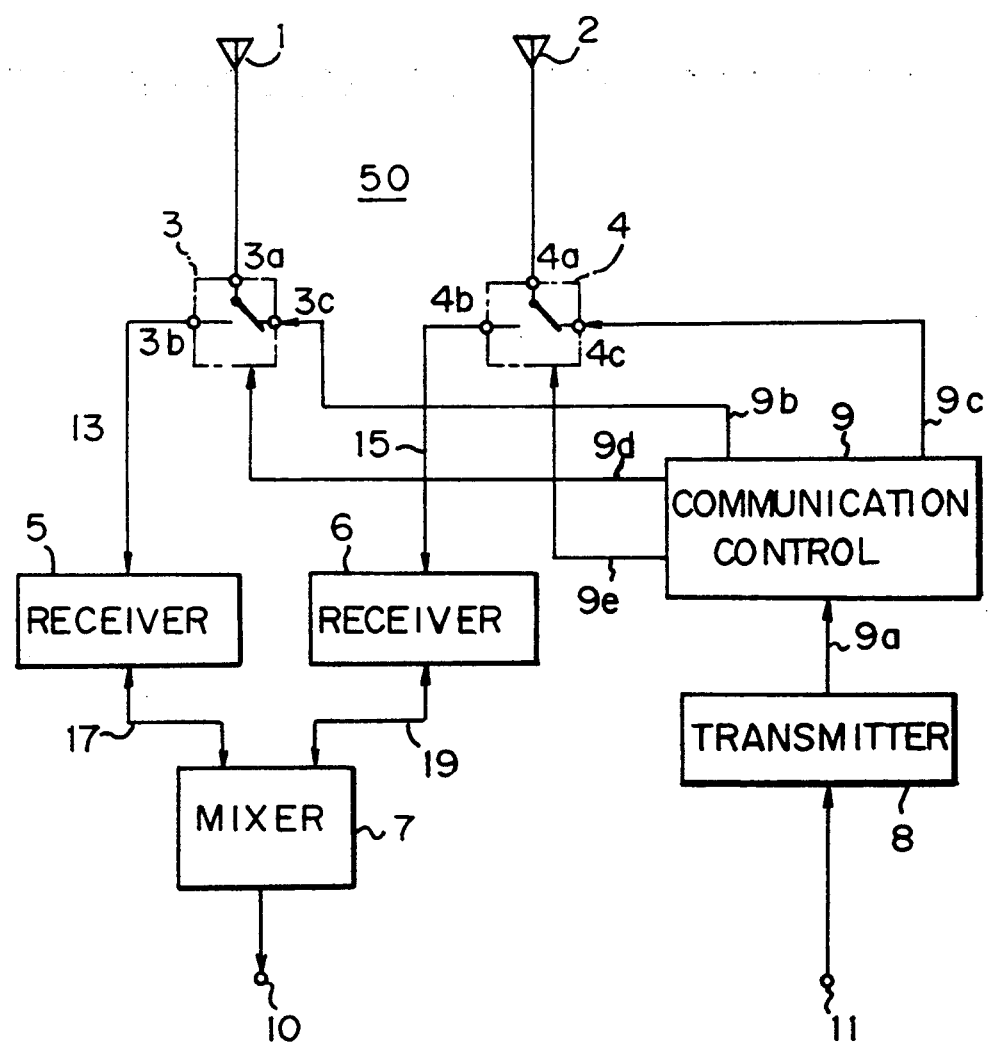
FIG. 1 is a block diagram schematically showing a preferred embodiment of the radio base station for a mobile data communication system to which a space diversity system of the present invention is applied.

Referring to FIG. 1 of the drawings, there is shown a base station or fixed radio equipment included in a mobile radio communication system to which the present invention is applied. The base station, generally 50, has, in the illustrative embodiment, two antennas 1 and 2 which are adapted for diversity transmission and reception. The antennas 1 and 2 are spaced apart from each other by a distance great enough to achieve the space diversity effect. Antenna switching circuits 3 and 4 have respectively terminals 3a and 4a, 3b and 4b, and 3c and 4c. The antennas 1 and 2 are connected to the terminals 3a and 4a of the antenna switching circuits 3 and 4, respectively. Receivers 5 and 6 have respectively terminals 13 and 15, and the terminals 3b and 4b of the antenna switching circuits 3 and 4 are connected to the terminals 13 and 15, respectively. A communication control circuit 9, which will be described, causes each of the antenna switching circuits 3 and 4 selectively into the connection shown in FIG. 1 and the opposite connection. Signals coming in through the antennas 1 and 2 are respectively routed through the antenna switching circuits 3 and 4 to the receivers 5 and 6. In response, the receivers 5 and 6 each mixes the input signal with intermediate frequency (IF) and amplifies it and delivers the resulting signal to a connecting line 17 or 19 associated therewith. The connecting lines are connected to a mixing circuit 7.

Based on the mixing space diversity system stated earlier, the mixing circuit 7 mixes the IF signals received over the pair of connecting lines 17 and 19 while locking their phases and returns the resultant signal to the receivers 5 and 6 over the lines 17 and 19. The mixer 7 has an output terminal 10. The receivers 5 and 6 also have a function of demodulating the mixed IF signal returned thereto from the mixing circuit 7 into a baseband signal. The baseband signal appears on the output terminal 10 via the mixing circuit 7.

The base station 50 has an input terminal 11 to which data or similar signal to be transmitted is applied. The input terminal 11 is connected to the input port of a transmitter 8 whose output port is in turn connected to the input 9a of the communication control circuit 9. The transmitter 8 has a modulator, not shown, and modulates radio frequency by the signal applied to the input terminal 11, the modulated radio signal appearing on the output 9a. The communication control circuit 9 delivers the modulated radio frequency signal via its signal outputs 9b and 9c. Also, the communication control circuit 9 feeds a control signal for causing the switching circuits 3 and 4 to perform switching operations via its control outputs 9d and 9e, respectively. The terminals 9b and 9c of the communication control circuit 9 are connected to the terminal 3c of the antenna switching circuit 3 and the terminal 4c of the antenna switching circuit 4, respectively.

Figure 3:
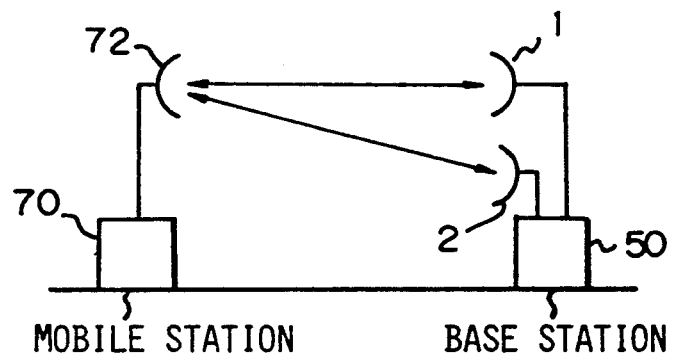
FIG. 3 schematically shows how signals are received in the illustrative embodiment of FIG. 1 or 2.

In operation, an electromagnetic wave sent from a mobile station or portable radio equipment 70, FIG. 3, is picked up by both of the antennas 1 and 2 of the base station 50. Electric fields generated by the received electromagnetic wave have a certain correlation which is determined by the spatial distance between the antennas 1 and 2. The signals coming in through the antennas 1 and 2 are respectively applied to the terminals 3a and 4a of the antenna switching circuits 3 and 4, respectively. The antenna switching circuits 3 and 4 are switched over to the same state at a common timing which is fed from the communication control circuit 9. Specifically, in the event of reception, the antennas 1 and 2 are switched into connection with the receivers 5 and 6, respectively. In this condition, the received signal applied to the terminal 3a of the antenna switching circuit 3 is fed to the receiver 5 via the terminal 3b. Likewise, the received signal applied to the terminal 4a of the antenna switching circuit 4 is delivered to the receiver 6 via the terminal 4b.

Figure 4A:
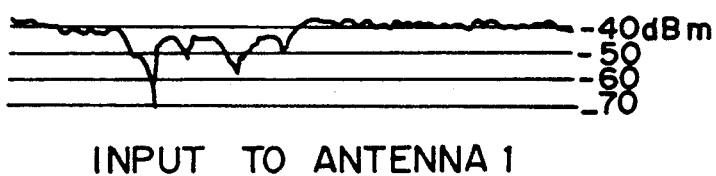
FIGS. 4A, 4B and 4C plot specific waveforms of signals which may be received in the system of FIG. 3.
Figure 4B:
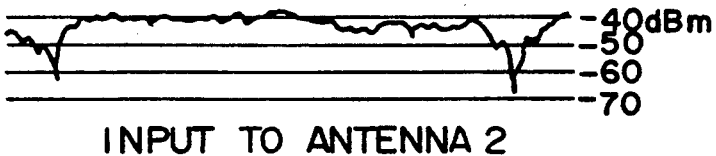
Figure 4C:
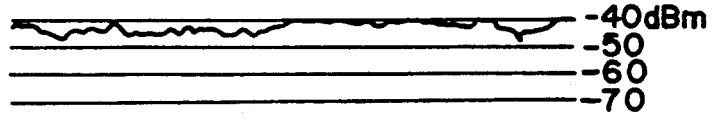

In response, the receivers 5 and 6 each mixes the input signal with IF and amplifies the resultant signal. The outputs of the receivers 5 and 6 are once fed to the mixing circuit 7 as IF and thereby mixed with their phases being locked. The mixed signal is returned from the mixing circuit 7 to the individual receivers 5 and 6 to be demodulated thereby. The demodulated received signal is fed out via the mixing circuit 7 and output terminal 10. By such a configuration, the output of the mixing circuit 7 is provided with high communication quality at all times and delivered to the outside via the output terminal 10. For example, assuming that the signals received by the antennas 1 and 2 have respectively the waveforms shown in FIGS. 4A and 4B when demodulated into the baseband, then the mixed signal from the mixing circuit 7 will have the waveform shown in FIG. 4C.

At the time of transmission, the antenna switching circuits 3 and 4 are respectively switched over to their transmit sides 3c and 4c under the control of the communication control circuit 9. A signal to be transmitted applied to the input terminal 11 is fed to the transmitter 8, i.e., the modulator, not shown, built in the transmitter 8. The modulator, not shown, modulates a carrier with the input signal, and the resulting signal is delivered from the transmitter 8 to the communication control circuit 9. In response, the communication control circuit 9 selectively distributes the input signal to the terminals 3c and 4c of the antenna switching circuits 3 and 4, respectively.

More specifically, the transmitter 8 holds the signal which arrives at the input terminal 11 and applies it to the modulator thereof twice with the switching period of the communication control circuit 9 between, causing the modulator to modulate the carrier with each of the resultant two input signals. As a result, two modulated burst signals are produced one after another. While the transmitter 8 is constructed to hold the signal arrived at the input terminals 11 for the purpose of retransmission, an arrangement may be made such that a single signal is fed twice to the input terminal 11. The communication control circuit 9 applies the first burst signal to the terminal 3c of the antenna switching circuit 3 and then the second burst signal to the terminal 4c of the antenna switching circuit 4. The burst signal applied to the terminal 3c of the antenna switching circuit 3 is transmitted via the terminal 3a and antenna 1, and then the burst signal applied to the terminal 4c of the antenna switching circuit 4 is sent out via the terminal 4a and antenna 2. These two burst signals are sequentially received by a single antenna 72, FIG. 3, included in the mobile station 70.

The electromagnetic waves sent from the base station 50 to the mobile station 70 as stated above generate input electric fields having a correlation which is determined by the spatial distance between the antennas 1 and 2. At the mobile station 70, a receiver, not shown, receives such electromagnetic waves and selects either one of the same signals coming in through the antenna 72 which has higher quality than the other.

Figure 2:
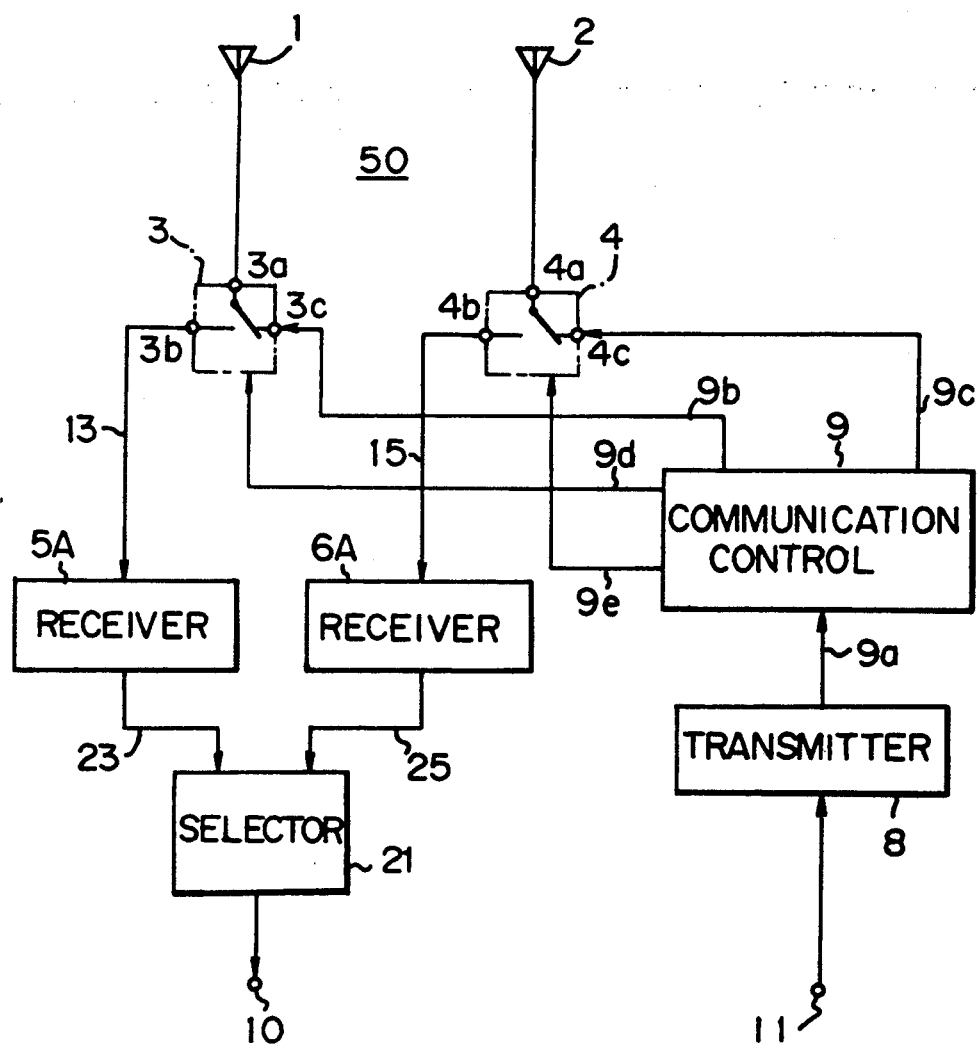
FIG. 2 is a block diagram similar to FIG. 1, schematically showing an alternative embodiment of the present invention.

FIG. 2 shows an alternative embodiment of the present invention. This embodiment is essentially similar to the embodiment of FIG. 1 except that the receivers 5 and 6 shown in FIG. 1 are replaced with receivers 5A and 6A, respectively, and that the mixing circuit 7 is replaced with a selecting circuit 21. In the figures, similar components or structural elements are designated by the same reference numerals, and redundant description will be avoided for simplicity. The receivers 5A and 6A amplify received signals arriving at their inputs 13 and 15 to demodulate them into baseband signals, and deliver the demodulated baseband signals to the selecting circuit 21 via output terminals 23 and 25, respectively. In response, the selector circuit 21 determines the electric fields of the signals appearing on the inputs 23 and 25, selects either one of the signals having a more intense electric field than the other, and feeds it out to the output 10. The rest of the operation is the same as in the embodiment described with reference to FIG. 1.

The two illustrative embodiments of the present invention each is representative of a half duplex communication system which uses a single carrier frequency for both of transmission and reception. Nevertheless, the present invention is practicable even with a full duplex communication system in which transmission and reception are implemented by two different frequencies, only if the antenna switching circuits 3 and 4 are replaced with an antenna hybrid circuit which is compatible with the two different frequencies.

Generally, data dealt with by the mobile station or portable equipment 70 and, therefore, the burst of a carrier has a short duration. For example, assuming that the length of the data is 20 bytes (160 bits) and the transmission rate is 9,600 bits per second, then the modulating time is approximately 17 milliseconds. It follows that the total modulating time during which the transmitter 8 performs modulation is approximately 35 milliseconds, i.e., the sum of about 17 milliseconds assigned to the modulation of the first signal, about 1 millisecond necessary for the communication control circuit 9 to execute switchover, and about 17 milliseconds for the modulation of the next signal which is identical in content with the first signal.

On the other hand, the motion of a person using the portable equipment 70 is not faster than about 1 meter per second because it is accompanied by operations. Concerning the distance, such a movement is not more than 35 millimeters with respect to the modulating period of 35 milliseconds of the transmitter 8. It may safely be said, therefore, that the electric fields ascribable to the signals successively received by the antenna 72 of the portable equipment 70 and having the same content have a correlation constant which undergoes only a negligibly small fluctuation. This suggests that in short-time data transmission a sufficient space diversity effect is achievable against interferential fading occurring within the transmission time.

In the illustrative embodiment, the portable radio equipment or mobile station 70 which needs a miniature and light-weight construction is capable of attaining a satisfactory space diversity effect without resorting to two antennas and two receivers for space diversity, i.e., simply by the improvement of the facilities of the fixed base station 50. The satisfactory space diversity effect insures high communication quality.

In summary, in accordance with the present invention, fixed radio equipment serving as a base station has a plurality of antennas for space diversity. At the time of transmission, the base station sends a signal via one antenna and then sends a signal identical in content with the former via another antenna. Hence, in ordinary mobile data communication or similar short-time data transmission, the correlation constant of an antenna of portable radio equipment or mobile station does not significantly fluctuate despite the interferential fading occurring in the transmission time, offering a satisfactory space diversity effect. With the present invention, therefore, it is possible to achieve a sufficient space diversity effect without needing two antennas and two receivers for space diversity, i.e., simply by improving the facilities of the base station. This allows the mobile station to be effectively implemented by the space diversity system while accomplishing a miniature and light-weight configuration.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. Fixed station radio equipment, comprising:
   means, responsive to a signal, for producing a plural number of successive identical bursts, each burst consisting of a carrier modulated by said signal;
   a plurality of antennas equal in number to the number of identical bursts and associated on a one-to-one basis with said identical bursts; and
   means, coupled to said producing means, for distributing said identical bursts to the associated antennas in sequence during respective nonoverlapping time intervals, said antennas transmitting the bursts in said time intervals as corresponding electromagnetico waves, said antennas being separated from each other by a predetermined distance selected so that the corresponding electromagnetic waves have substantially minimized correlation with respect to interferential fading.

2. Radio equipment in accordance with claim 1, further comprising:
   receiver means for demodulating signals received by said plurality of antennas into baseband signals to thereby output a received signal whose interferential fading has been minimized by diversity; and
   switch means, interposed between said plurality of antennas, said distributing means and said receiver means, for selectively connecting said plurality of antennas to either said distributing means or said receiver means under a control of said distributing means;
   said distributing means causing said switch means to connect, at the time of transmission, said plurality of antennas to said distributing means and connect, at the time of reception, said plurality of antennas to said receiver means.

3. Radio equipment in accordance with claim 2, wherein said receiver means comprises a plurality of receivers associated on a one-to-one basis with said plurality of antennas, each receiver for amplifying the signal received by the associated antenna and demodulating the signal into a first baseband signal; and
   signal mixing means for mixing the signals amplified by said plurality of receivers to feed a resultant mixed signal to said plurality of receivers;
   said plurality of receivers each demodulating the mixed signal into a second baseband signal.

4. Radio equipment in accordance with claim 2, wherein said receiver means comprises a plurality of receivers associated on a one-to-one basis with said plurality of antennas, each receiver for amplifying the signal received by the associated antenna and demodulating the signal into a baseband signal;

said radio equipment further comprising signal selecting means for determining power levels of the signals demodulated by said plurality of receivers and outputting one of said signals having a higer power level than the remainder of said signals.

5. Radio equipment according to claim 1, wherein the number of identical bursts and the number of antennas are each two.

6. Radio equipment according to claim 1, wherein said producing means holds the signal and includes a single modulator which repeated modulates the carrier with the signal, thereby to obtain the identical bursts.

7. A mobile radio device adapted to receive a signal transmitted from a fixed station radio device, the fixed station device trensmitting identical bursts during successive time intervals as electromagnetic waves from respective antennas which are spaced apart by a predetermined distance selected so that the corresponding electromagnetic waves have substantially minimized correlation with respect to interferential fading, each burst including a carrier modulated by the signal, the mobile station radio device including a single antenna for successively receiving the waves; and a receiver having means, coupled to said single antenna, for selecting a highest quality signal from among the received waves, and outputting the selected signal.

8. A radio communication system, comprising a fixed station including means, responsive to a signal, for producing a plural number of successive identical bursts, each burst consisting of a carrier modulated by said signal, a plurality of antennas equal in number to the number of identical bursts and associated on a one-to-one basis with said identical bursts, and means, coupled to said producing means, for distributing said identical bursts to the associated antennas in sequence during respective nonoverlapping time intervals, said antennas transmitting the bursts in said time intervals as corresponding electromagnetic waves, said antennas being separated from each other by a predetermined distance selected so that corresponding electromagnetic waves have substantially minimized correlation with respect to interferential fading; and a mobile station adapted to receive the signal from the base station, including a single antenna for successively receiving the waves, and a receiver having means, coupled to said single antenna, for selecting a highest quality signal from among the received waves, and outputting the selected signal.

9. A method of transmitting a signal from a fixed station to a mobile station, the method comprising the steps of:

producing a plural number of successive identical bursts, each burst consisting of a carrier modulated by said signal;

providing a plurality of antennas equal in number to the number of identical bursts and associated on a one-to-one basis with said identical bursts;

separating the antennas from each other by a predetermined distance;

distributing said identical bursts to the associated antennas in sequence during respective nonoverlapping time intervals; and transmitting the bursts from the antennas to the mobile station in said time intervals as corresponding electromagnetic waves, the predeterined distance being selected so that said corresponding electromagnetic waves have substantially minimized with respect to interferential fading.

10. A method according to claim 9, wherein said step of producing comprises the steps of holding said signal and applying the held signal repeatedly to a modulator which modulates the carrier with the signal to obtain said identical bursts.

11. A method according to claim 9, wherein the electromagnetic waves and the signals thereof are degraded during transmission by different respective amounts, further comprising the steps of receiving the electromagnetic waves at the mobile station with a single antenna, comparing the signals of the received electromagnetic waves and selecting and outputting one of the signals having a highest quality.

* * * * *